United States Patent [19]
Tomita

[11] Patent Number: 5,844,143
[45] Date of Patent: Dec. 1, 1998

[54] ELECTROMAGNETIC FLOWMETER

[75] Inventor: Toyofumi Tomita, Tokyo, Japan

[73] Assignee: Kabushiki Kaisha Toshiba, Kanagawa-ken, Japan

[21] Appl. No.: 183,910

[22] Filed: Jan. 19, 1994

Related U.S. Application Data

[63] Continuation of Ser. No. 870,368, Apr. 17, 1992, abandoned.

[51] Int. Cl.$^6$ ....................................................... G01F 1/60
[52] U.S. Cl. .................................... 73/861.12; 73/861.16; 73/861.17; 73/861.13
[58] Field of Search ............................ 73/861.12, 861.16, 73/861.17, 861.11, 861.13, 861.14, 861.15

[56] References Cited

U.S. PATENT DOCUMENTS

| | | | |
|---|---|---|---|
| 3,783,687 | 1/1974 | Mannhez et al. | 73/861.17 |
| 3,991,612 | 11/1976 | Mannherz et al. | 73/861.17 |
| 4,227,408 | 10/1980 | Schmock et al. | 73/861.17 |
| 4,236,410 | 12/1980 | Appel et al. | 73/861.12 |
| 4,296,636 | 10/1981 | Mannherz | 73/861.17 |
| 4,408,497 | 10/1983 | Suzuk | 73/861.17 |
| 4,644,799 | 2/1987 | Tomita | 73/861.17 |
| 4,651,286 | 3/1987 | Fuckai et al. | 73/861.17 |
| 4,658,653 | 4/1987 | Tomita | 73/861.17 |
| 4,704,907 | 11/1987 | Mannherz et al. | 73/861.17 |
| 4,773,274 | 9/1988 | Kobayashi et al. | 73/861.16 |
| 5,253,537 | 10/1993 | Tomita et al. | 73/861.15 |
| 5,275,059 | 1/1994 | Lew et al. | 73/861.15 |

FOREIGN PATENT DOCUMENTS 2856240  7/1980  Germany.

OTHER PUBLICATIONS

Patent Abstracts of Japan, vol. 5, No. 48, JP–A–56 002 508, Apr. 7, 1981.

*Primary Examiner*—Ronald L. Biegel
*Attorney, Agent, or Firm*—Finnegan, Henderson, Farabow, Garrett & Dunner, L.L.P.

[57] ABSTRACT

An electromagnetic flowmeter for measuring a flow rate of a fluid which flows through a measuring pipeline arranged in a controlled magnetic field. The electromagnetic flowmeter includes an electromagnet unit excited by an exciting current, for generating a magnetic flux in the controlled magnetic field, a magnetic sensor unit for measuring a density of the magnetic flux generated in the controlled magnetic field, and a signal generating unit for generating an electric signal according to the density of the magnetic flux generated in the controlled magnetic field and a flow speed of the fluid, an adjusting unit, coupled to the magnetic sensor unit, for adjusting the magnetic flux density to a predetermined value by controlling the exciting current. The flowmeter also includes a measuring unit for measuring the electric signal at a predetermined time cycle determined by a frequency of the exciting current, thus causing the electric signal to be measured every time the magnetic flux density is at the predetermined value. A computation unit computes the flow rate of the fluid based on the measured electric signal and an exciting current at a time when the measured electric signal is detected.

9 Claims, 5 Drawing Sheets

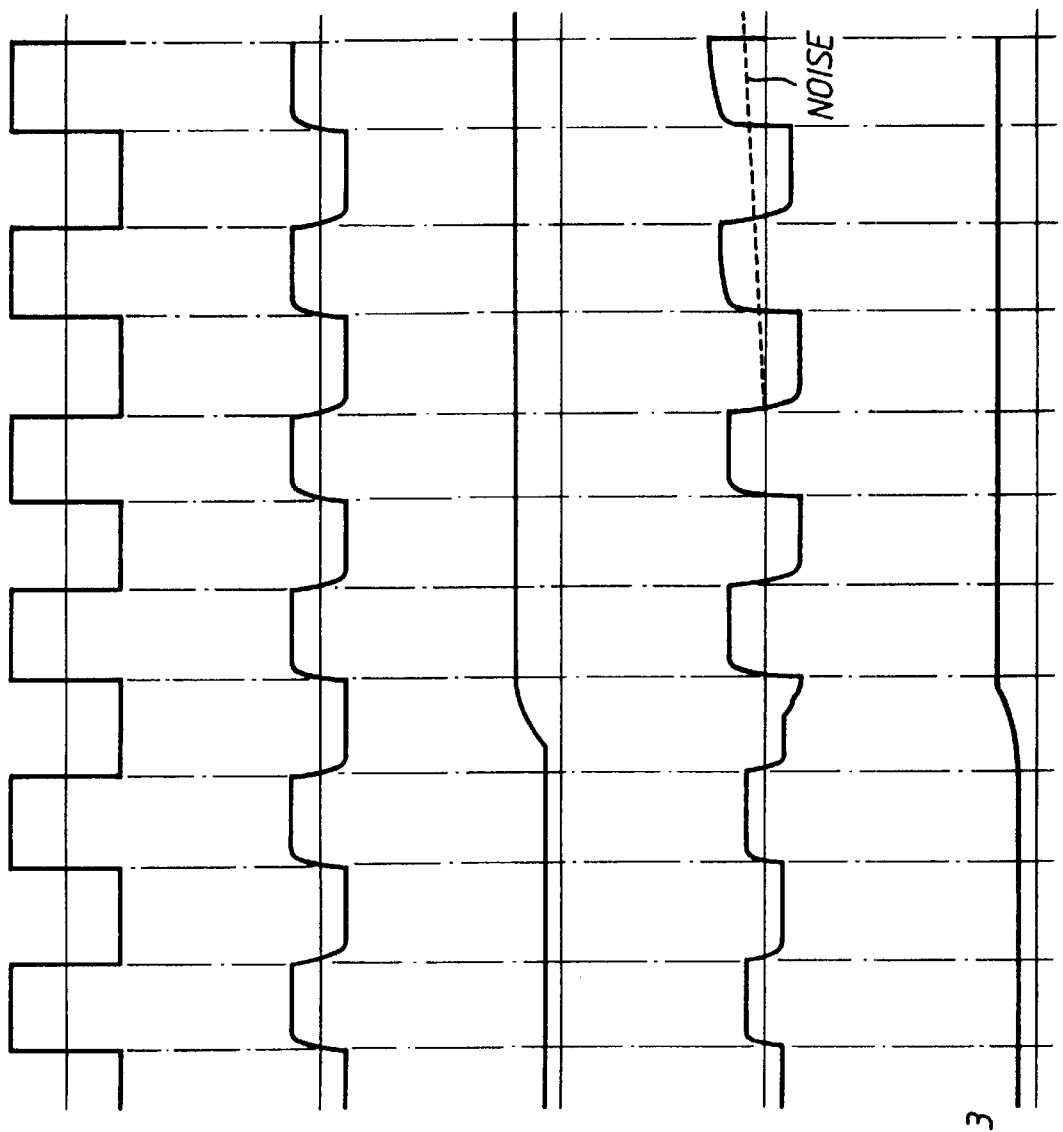

ELECTROMAGNETIC FLOWMETER

This application is a continuation of application Ser. No. 07/870,360, filed Apr. 17, 1992, now abandoned.

BACKGROUND OF THE INVENTION

This invention relates to an electromagnetic flowmeter, and more particularly to an electromagnetic flowmeter using a magnetic sensor for measuring magnetic flux density.

In prior art, one type of electromagnetic flowmeter is an apparatus for the measurement of the flow rate of a conductive fluid. This electromagnetic flowmeter has a detector constructed such that the fluid flows through a measuring pipeline and electrodes are attached to an internal wall of this measuring pipeline. A magnetic flux is generated in the measuring pipeline by means of exciting coils of an exciting circuit in which an alternating exciting current flows. A detector signal, a voltage signal in proportion to a density of the magnetic flux and an average flow speed of the fluid flowing through the measuring pipeline, are output from the electrodes, amplified by an amplifier and processed by a transducer. After the amplifier has amplified the detector signal, a flow rate signal indicating the flow rate of the fluid flowing in the measuring pipeline is generated through signal processing by a computing element.

In this case, since a value of the exciting current supplied to the exciting coil and the density of the magnetic flux generated within the measuring pipeline are in proportion, when the exciting current is fixed so that a value of the detector signal output from the electrode corresponds only with the average flow speed of the fluid, a construction of the computing element may be simplified by calculating the flow rate from the value of the detector signal.

FIG. 1 shows a circuit diagram of an exciting circuit used in a conventional electromagnetic flowmeter. In the exciting circuit, an exciting current is generated by direct current power source 101. Contact point bridge circuit 106 is constructed such that two usually open contact points 102 and 103 are closed when an exciting clock is supplied to those points and two usually closed contact points 104 and 105 are open when the exciting clock is supplied to those points. A value of the exciting current flowing in contact point bridge circuit 106 is regulated by transistor 107, and current detection resistor 109 detects a value of the exciting current flowing in exciting coil 108 driven by contact point bridge circuit 106. Reference voltage source 110 generates a reference voltage and the reference voltage is compared with a measured voltage obtained from resistor 109. Based on the results of this comparison, the value of the exciting current detected by resistor 109 is fixed to a value corresponding to the reference voltage. Computing amplifier 111 controls a conducting quantity of transistor 107. The contact point bridge 106, driven by the exciting clock, generates an alternating current from a direct current obtained from direct current power source 101.

This alternating current is the exciting current supplied to exciting coil 108, and the value of the exciting current is normally detected by resistor 109. Computing amplifier 111 controls the quantity conducted by transistor 107 according to the results of this detection and thus, the fixed value of the exciting current is maintained.

However, when such electromagnetic flowmeters determine flow rates of liquid pulp and other slurry fluids, these liquid pulps and other slurry fluids contain solid matters which often cause problems such as the presence of low frequency noise which affects the detector signal output from the electrodes making measurement impossible.

Consequently, a method solving such problems has been suggested which utilises the characteristic 1/F possessed by matters generating a noise that, as a frequency of the exciting current is raised a noise level is lowered accordingly. Thus, raising the frequency of the exciting circuit improves the S/N ratio of the detection signal.

However, in such an exciting circuit as that shown in FIG. 1, when the value of the exciting current having a square wave form is fixed, an effect of an eddy current flowing in the case of a detector such as that shown in FIG. 2 is that the magnetic flux within the detector does not follow the exciting current immediately. Thus, when the frequency of the exciting current is raised, the build up and down of the magnetic flux is delayed, causing error in the measurement.

Subsequently, it has been considered that a means to solve such problems in the method for raising the frequency of the exciting current would be the installation of a magnetic sensor within the detector so that the magnetic flux within the detector is detected immediately by the magnetic sensor, and thus the exciting current would be controlled at a fixed value.

SUMMARY OF THE INVENTION

It is an object of the invention to improve the precision of measuring a flow rate by an electromagnetic flowmeter.

Another object is to make it possible to improve the controllability of the density of magnetic flux generated within a measuring pipeline into which a fluid flows in an electromagnetic flowmeter.

The foregoing objects are achieved according to the present invention by providing an electromagnetic flowmeter for measuring a flow rate of a fluid which flows through a measuring pipeline arranged in a controlled magnetic field, comprising: electromagnet means excited by an exciting current, for generating a magnetic flux in the controlled magnetic field; magnetic sensor means for measuring a density of the magnetic flux generated in the controlled magnetic field; signal generating means for generating an electric signal according to the density of the magnetic flux generated in the controlled magnetic field and a flow speed of the fluid; adjusting means, coupled to the magnetic sensor means, for adjusting the magnetic flux density to a predetermined value by controlling the exciting current; measuring means for measuring the electric signal at a predetermined time cycle which is determined by a frequency of the exciting current, whereby the electric signal is measured every time when the magnetic flux density is on the predetermined value; and computation means for computing the flow rate of the fluid based on the measured electric signal and an exciting current at a time when the measured electric signal is detected.

According to another aspect of the present invention, the above objects are achieved by providing a method for of measuring a flow rate of a fluid which flows through a measuring pipeline arranged in a controlled magnetic field controlled by an exciting current, comprising the steps of: generating a magnetic flux generated in the controlled magnetic field; measuring a density of the magnetic flux generated in the controlled magnetic field; generating an electric signal according to the density of the magnetic flux generated in the controlled magnetic field and a flow speed of the fluid; adjusting the magnetic flux density to a predetermined value by controlling the exciting current; measuring the electric signal at a predetermined time cycle which is determined by a frequency of the exciting current, whereby the electric signal is measured every time when the magnetic flux density is on the predetermined value; and computing the flow rate of the fluid based on the measured electric signal and an exciting current at a time when the measured electric signal is detected.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 6 (a) to 6 (e) are waveform diagrams showing the operations of the electromagnetic flowmeter shown in FIG. 3.

DESCRIPTION OF THE PREFERRED EMBODIMENTS

Figure 1:
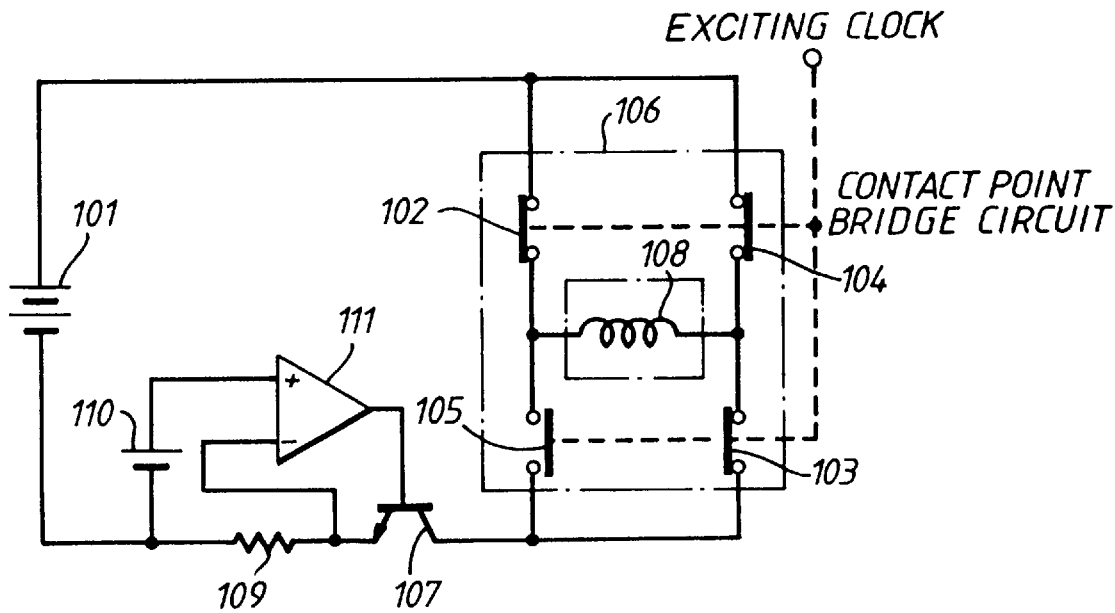
FIG. 1 is a circuit diagram showing an exciting circuit of a conventional electromagnetic flowmeter.
Figure 2:
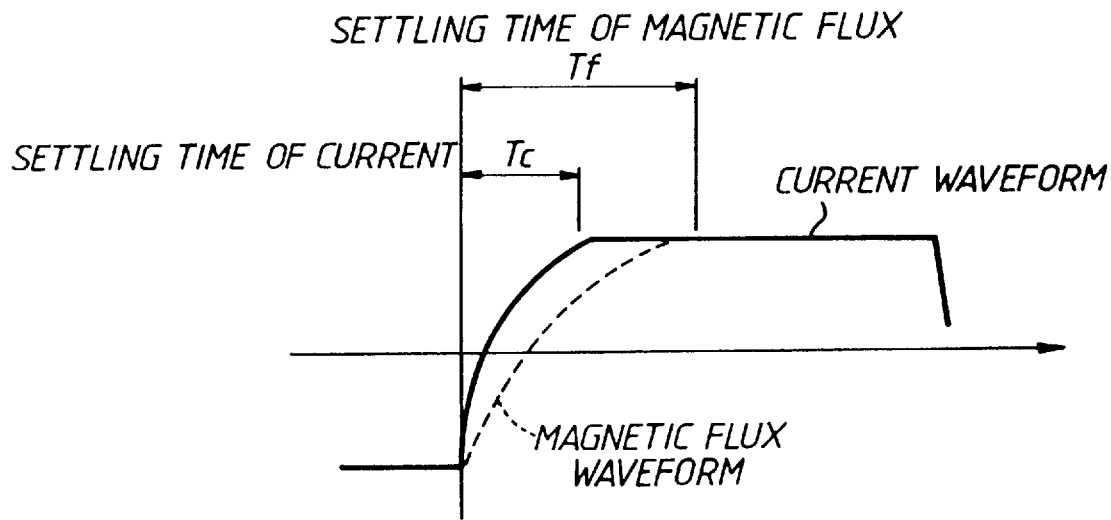
FIG. 2 is a waveform diagram showing a relationship between an exciting current and a magnetic flux of a conventional electromagnetic flowmeter.
Figure 3:
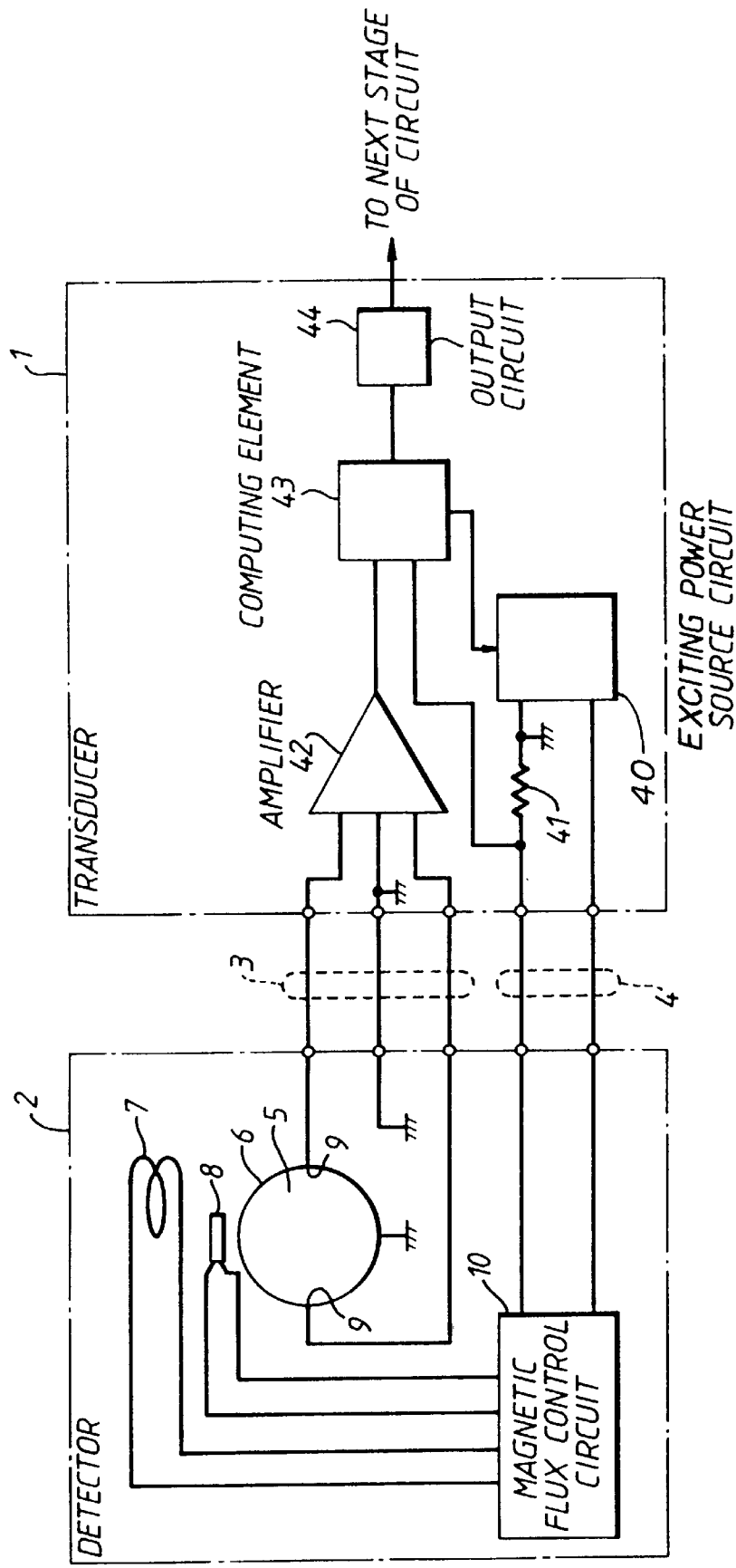
FIG. 3 is a block diagram showing an embodiment of an electromagnetic flowmeter according to the invention.

FIG. 3 is a block diagram showing an embodiment of an electromagnetic flowmeter according to the invention.

This figure shows an electromagnetic flowmeter which has transducer 1, detector 2, signal cable 3 and exciting cable 4. An exciting current is output from transducer 1 and supplied to detector 2 along exciting cable 4 to operate detector 2. A detector signal obtained by a detection operation of detector 2 is supplied to transducer 1 along signal cable 3.

In detector 2, an object under measurement is fluid 5 flowing in measuring pipeline 6. Exciting coil 7 is installed to an exterior of this measuring pipeline 6 and, magnetic sensor 8 which detects the density of the magnetic flux generated by exciting coil 7 is installed in practically the same section as exciting coil 7. A pair of electrodes 9 are installed inside measuring pipeline 6 facing each other. The exciting current output from transducer 1 is input along exciting cable 4 to drive exciting coil 7 and generate a magnetic flux within measuring pipeline 6. The density of the magnetic flux generated by the exciting current flowing in exciting coil 7 is detected by magnetic sensor 8 and controlled by magnetic flux control circuit 10. The exciting current output from transducer 1 along exciting cable 4 is input to exciting coil 7 generating a magnetic flux within measuring pipeline 6. The detector signal is generated between each of electrodes 9 in proportion to the flow rate of fluid 5 flowing in measuring pipeline 6. This detector signal is supplied to transducer 1 along signal cable 3.

Figure 4:
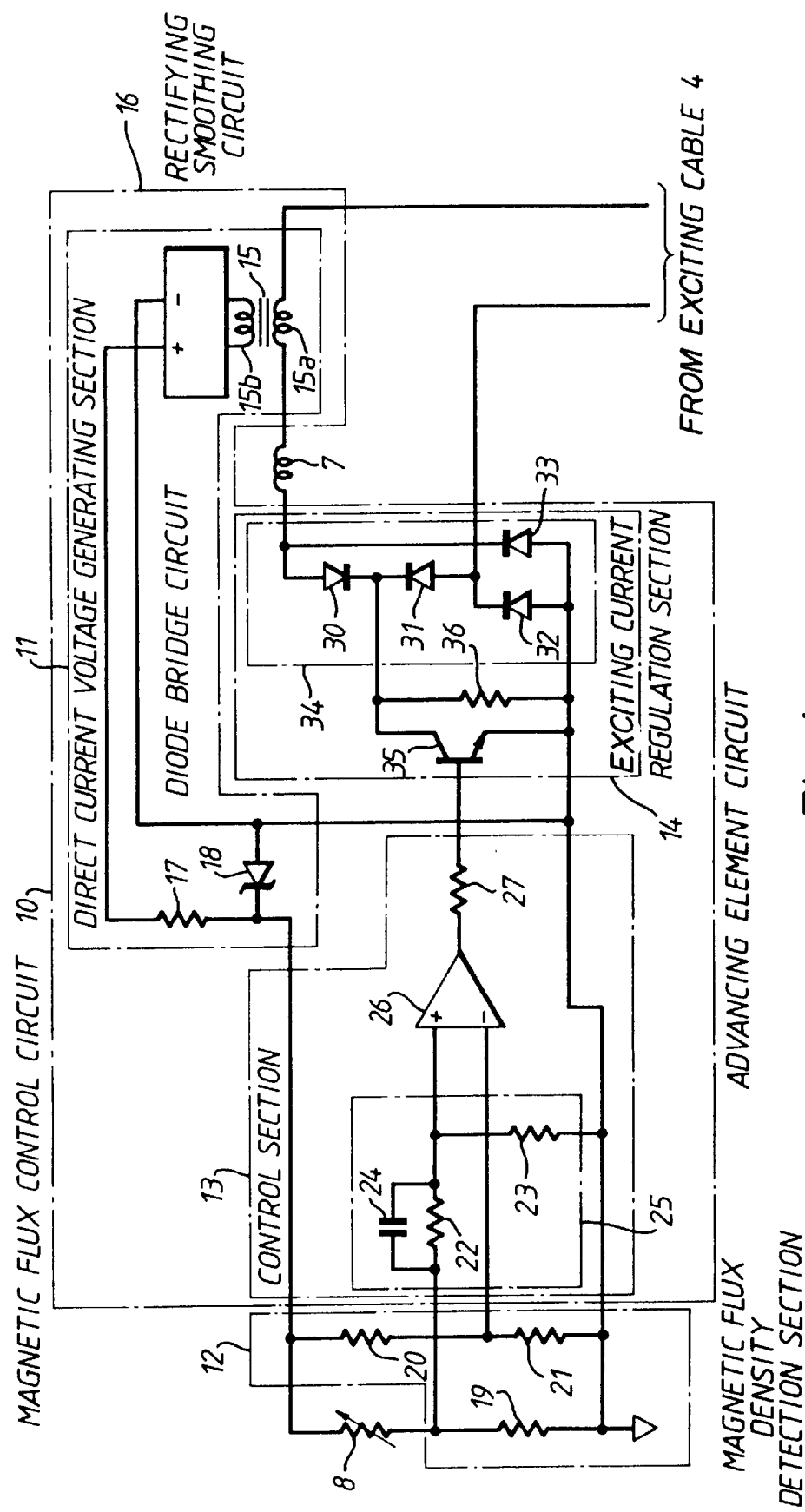
FIG. 4 is a circuit diagram showing the magnetic flux control circuit shown in FIG. 3.

In this case, as is shown in FIG.4, magnetic flux control circuit 10 has a direct current voltage generation section 11 and control section 13 and exciting current regulation section 14. A direct current voltage is produced from the exciting current supplied along exciting cable 4 by direct current voltage generating section 11 supplying power to all parts of the circuit. The resistance of magnetic sensor 8 is detected by magnetic flux density detection section 12. Control section 13 generates a control signal according to the results of the detection which operates exciting current regulation section 14. The volume of the exciting current is regulated so that the density of the magnetic flux generated by exciting coil 7 is at the preset value.

In direct current voltage generation section 11, primary coil 15a of transformer 15 is connected in series to exciting coil 7. Rectifying smoothing circuit 16 rectifies alternating current voltage obtained in secondary coil 15b of transformer 15 to generate a direct current voltage. The direct current voltage obtained by rectifying smoothing circuit 16 is conducted through resistor 17 to magnetic flux density detection section 12. A value of the direct current voltage supplied to magnetic flux density detection section 12 through resistor 17 is set to a preset value by Zener diode 18. As described above, direct current voltage generating section 11 generates the exciting current supplied along exciting cable 4 to the direct current voltage at the preset value supplied to magnetic flux detection section 12.

Magnetic flux density detection section 12 is constructed of magnetic sensor 8 together with a resistance bridge circuit of 3 resistors 19–21. The direct current voltage output from direct current voltage generating section 11 operates magnetic flux density detection section 12 to generate a magnetic flux density signal according to the value of the resistance of magnetic sensor 8 which is supplied to control section 13.

Control section 13 is so constructed that two resistors 22 and 23 are connected in series and advancing element circuit 25 consists of capacitor 24 connected in parallel to resistor 22. The delay generated by exciting coil 7 and the case of detector 2 etc is compensated by advancing element circuit 25. A voltage obtained at the contact points of resistors 20 and 21 is used as a reference voltage, and a voltage obtained at the contact points of magnetic sensor 8 and resistor 19 is the magnetic flux density signal. These signals input into differential amplifier 26 to generate a current regulation signal according to a difference voltage between the reference voltage and magnetic flux density signal. The current regulating signal is conducted into exciting current regulating section 14 through current limiting resistor 27.

In exciting current regulation section 14, diode bridge circuit 34 is formed with four diodes, diodes 30–33. Transistor 35 is conducted to diode bridge circuit 34 based on the value of the current regulation signal supplied from the control section. Transistor 40 also controls the exciting current. Even when transistor 35 is off the exciting current may flow through resistor 36 to some extent. Transistor 35 is conducted according to the current regulation signal supplied from control section 13, and consequently, the value of the current flowing in exciting coil 7 is regulated by transistor 35.

Then, magnetic flux density detection section 12 detects the resistance of magnetic sensor 8, and the density of the magnetic flux within measuring pipeline 6 is detected from the detected resistance of magnetic sensor 8. Based upon the results of this detection, control section 13 generates the current regulation signal controlling exciting current regulation section 14. With that signal, the value of the exciting current supplied to exciting coil 7 is regulated and the density of the magnetic flux is set at a value. Therefore, during the period of exciting current build up and down in which the density of the magnetic flux is lowered, the value of the exciting current conducted is increased by transistor 35 and the density of the magnetic flux quickly returns to the preset value. Consequently, when the frequency of the exciting current is raised, the density of the magnetic flux generated in measuring pipeline 6 can be fixed at a constant value.

In addition, in transducer 1 shown in FIG. 3, exciting power source circuit 40 generates a presetting frequency of the clock signal and the exciting current. Resistor 41 generates the exciting current value detector signal according to the value of the exciting current output from exciting power source circuit 40. Amplifier 42 amplifies the detector signal output from detector 2 along signal cable 3. Based upon the exciting current value detector signal obtained from resistor 41, computing element 43 compensates the detector signal supplied from amplifier 42 and removes the exciting current value fluctuations which cause error. Output circuit 44 converts the detector signal output from computing element 43 to a 4–20 mA unified signal. With the construction described above, the alternating exciting current is generated and delivered into exciting cable 4 to drive detector 2. The detector signal output from detector 2 along signal cable 3 through computing processing is generated as an unified signal.

Figure 5:
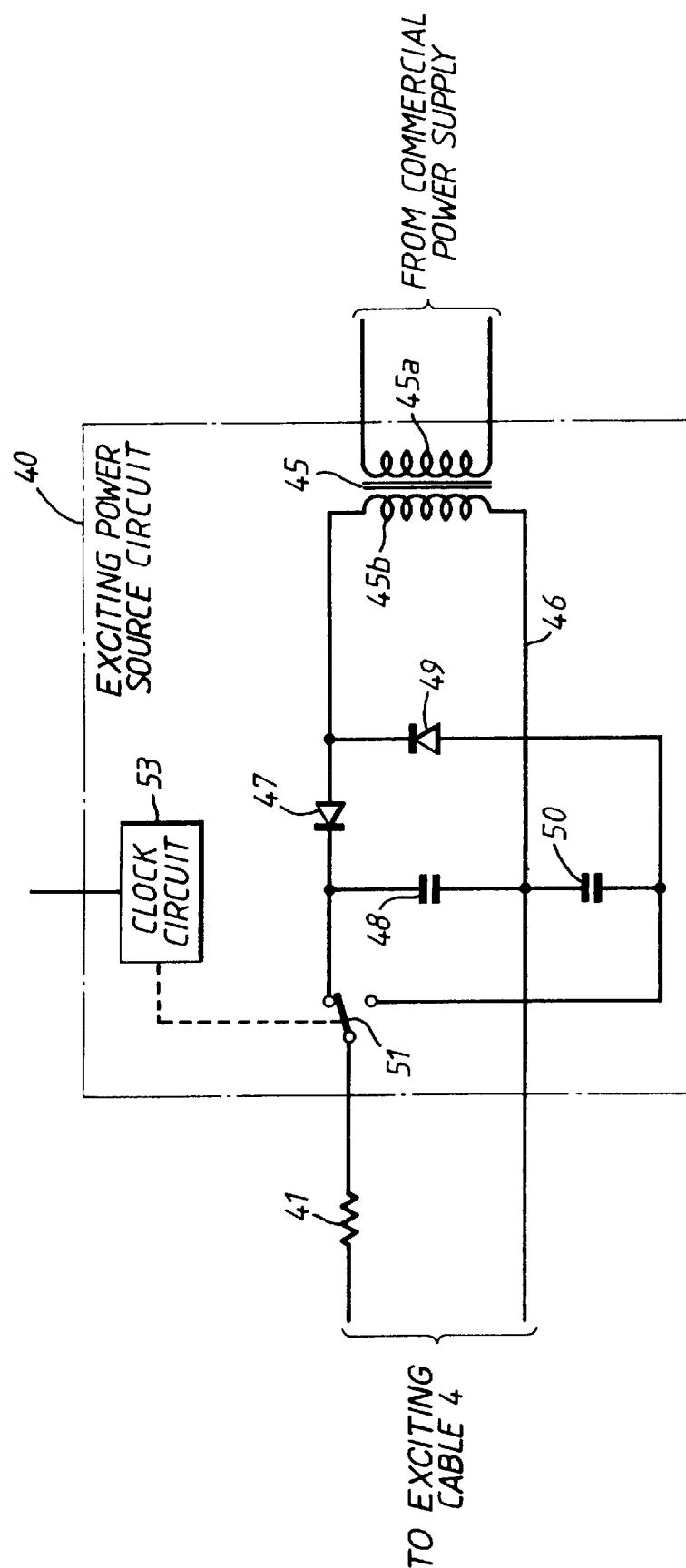
FIG. 5 is a circuit diagram showing the exciting power source circuit shown in FIG. 3.

Then, in exciting power source circuit 40 shown in FIG. 5, transformer 45 transforms an alternating power voltage supplied from a suitable power source. Diode 47 rectifies the alternating voltage obtained from secondary coil 45b of transformer 45 and generates positive polarity voltage against common line 46. The positive voltage is maintained by capacitor 48. The diode 49 rectifies the alternating voltage obtained from secondary coil 45b and generates a negative polarity voltage against common line 46. The negative polarity voltage is maintained by capacitor 50. Clock circuit 53 generates a clock signal having a preset frequency, supplied to computing element 43 and every part of the circuit. In response to the clock signal output from clock circuit 53, switch 51 selects the positive voltage and negative voltage maintained by capacitor 48 and 50 reciprocally and generates the alternating exciting current. The alternating exciting current generated is delivered to resistor 41 along exciting cable 4.

In addition, since the alternating voltage obtained from secondary coil 45b of transformer 45 in this exciting power source circuit 40 generates a double voltage rectified exciting current, The effect of a load can be easily obtained. Therefore, when a consuming power of detector 2 becomes increased, that is, when the value of the exciting current reaches a prescribed value with a fall of the voltage of the exciting current, the consuming power of transistor 35 installed in magnetic flux control circuit 10 falls and a total consuming power of the electromagnetic flowmeter also falls.

The following FIGS. 6(a) to 6(e) are illustrations of operations of the embodiment.

Firstly, FIG. 6(a) shows an exciting current which should be output from exciting power source circuit 40. Exciting coil 7 excited by the exciting current produces a magnetic flux as shown by FIG. 6(b) within measuring pipeline 6. FIG. 6(c) shows the detector signal output by each electrode 9 according to the average flow rate of fluid 5 flowing in measuring pipeline 6 and the density of the magnetic flux. FIG. 6(d) shows the detector signal amplified by amplifier 42 of transducer 1.

Then, magnetic flux control circuit 10 installed in detector 2 ensures the density of the magnetic flux generated by exciting coil 7 is constant. The value of the exciting current flowing in exciting coil 7 is controlled to the fixed value (absolute value). When the frequency of the exciting current is raised, the magnetic flux can be built up or down precisely.

In addition, when the exciting current is stabilized, for example a little just before the exciting current is changed from a preset value signal to the other preset value signal, the output from amplifier 42 is input into computing element 43. As shown in FIG. 6(e), an output signal indicating the flow rate of fluid 5 flowing within measuring pipeline 6 is output from computing element 43. A unified signal is generated according to the output signal by output circuit 44.

In this embodiment, the value of the exciting current flowing in exciting coil 7 is controlled so that the magnetic flux generated within measuring pipeline 6 is at the preset value. The detector signal output from detector 2 is input into transducer 2 when the exciting current is stabilized. Since the value of the exciting current is compensated and the value of this detector signal is generated as an unified signal, when the exciting frequency is raised, the magnetic flux within detector 2 is fixed and the flow rate of slurry fluids can be measured precisely.

In addition, in the abovementioned embodiment, direct current voltage generating section 11 to which the exciting current is supplied, installed in magnetic flux control circuit 10 generates the direct current voltage used in magnetic flux control circuit 10. The direct current voltage used in magnetic flux control circuit 10 may be generated in similar ways, and the direct current voltage generated from other suitable sources of power may be used in all parts of magnetic flux control circuit 10.

When this invention is used as described above, when the exciting frequency is raised, the magnetic flux within the detector is fixed and the flow rate of slurry fluids can be measured precisely.

What is claims is:

1. An electromagnetic flowmeter for measuring a flow rate of a fluid that flows through a measuring pipeline arranged in a controlled magnetic field, comprising:

electromagnetic means excited by a square wave exciting current, for generating a magnetic flux in the controlled magnetic field;

magnetic sensor means for measuring a density of the magnetic flux generated in the controlled magnetic field;

signal generating means for generating an electric signal according to the density of the magnetic flux generated in the controlled magnetic field and according to a flow speed of the fluid;

adjusting means, coupled to the magnetic sensor means, for adjusting the density of the magnetic flux to a predetermined value by controlling the square wave exciting current;

measuring means for measuring the electric signal at a predetermined time cycle determined by a frequency of the square wave exciting current; and computation means for computing the flow rate of the fluid based on the measured electric signal and based on the square wave exciting current when the measured electric signal is detected, whereby the flow rate of the fluid can be measured accurately regardless of the fluctuation of the square wave exciting current.

2. The electromagnetic flowmeter of claim 1, wherein the adjusting means includes DC voltage generating means for generating DC power by converting the exciting current to direct current that supplies power to the magnetic sensor means and includes controlling means for controlling the exciting current.

3. The electromagnetic flowmeter of claim 1, wherein the computation means includes means for measuring the exciting current, and computing means for computing the flow rate of the fluid.

4. A method of measuring a flow rate of a fluid that flows through a measuring pipeline arranged in a controlled magnetic field controlled by a square wave exciting current, comprising the steps of:

generating a magnetic flux in the controlled magnetic field;

measuring a density of the magnetic flux generated in the controlled magnetic field;

generating an electric signal according to the density of the magnetic flux generated in the controlled magnetic field and according to a flow speed of the fluid;

adjusting the magnetic flux density to a predetermined value by controlling the square wave exciting current;

measuring the electric signal at predetermined time cycle determined by a frequency of the square wave exciting current; and computing the flow rate of the fluid based on the measured electric signal and based on the square wave exciting current when the measured electric signal is detected, whereby the flow rate of the fluid can be measured accurately regardless of the fluctuation of the square wave exciting current.

5. The method of claim 4, wherein the step of adjusting includes the step of generating DC power by converting the exciting current to direct current, and step of controlling the exciting current.

6. The method of claim 4, wherein the step of computing includes the step of measuring the exciting current, and the step of computing the flow rate of the fluid.

7. An electromagnetic flowmeter using a square wave exciting current, comprising:

an exciting coil, arranged out of a measuring pipeline, for generating a magnetic flux in the measuring pipeline in which fluid flows;

an exciting power source circuit, including a clock circuit for generating a clock signal with a predetermined frequency, for supplying to the exciting coil the square wave exciting current corresponding to the frequency of the clock signal;

an electromagnetic sensor, arranged out of the measurement pipeline and near the exciting coil, for detecting a density of the magnetic flux generated in the measuring pipeline;

a magnetic flux control circuit for controlling the square wave exciting current supplied from the exciting power source circuit to the exciting coil, so as to set the density of the magnetic flux detected by the electromagnetic sensor at a predetermined value;

a pair of electrodes, installed so as to face inside of the measurement pipeline, for detecting an electric signal with a value corresponding to a flow rate of the fluid which flows through the measuring pipeline;

sampling means for sampling the electric signal detected by the electrodes, in accordance with the frequency of the clock signal generated from the clock circuit;

compensating means for compensating the electric signal on the basis of a signal supplied from the exciting coil in accordance with the square wave exciting current, so as to eliminate an error in the electric signal due to a fluctuation of the square wave exciting current; and output means for outputting the electric signal adjusted by the compensating means, by converting the adjusted electric signal to a predetermined signal form.

8. An electromagnetic flowmeter according to claim 7, wherein the magnetic flux control circuit includes:

a direct current voltage generating section for generating direct current voltage on the basis of the square wave exciting current supplied from the exciting power source circuit;

a magnetic flux density detection section for detecting the magnetic flux density on the basis of an electric signal output from the electromagnetic sensor;

a control section for generating a control signal corresponding to the magnetic flux density value detected by the magnetic flux density detection section; and an exciting current regulation section for controlling the square wave exciting current so as to set the magnetic flux density at a predetermined value in accordance with the control signal generated by the control section.

9. An electromagnetic flowmeter according to claim 7, wherein the exciting coil, the electromagnetic sensor, the magnetic flux control circuit, and the electrodes comprise a detector, wherein the exciting power source circuit, the sampling means, the compensating means, and the output means comprise a converter, and wherein the detector and the converter are electrically coupled by a communication cable and an excitation cable.

* * * * *